(12) United States Patent
Wootton et al.

(10) Patent No.: US 10,871,084 B2
(45) Date of Patent: Dec. 22, 2020

(54) MOUNT ASSEMBLY

(71) Applicant: ROLLS-ROYCE plc, London (GB)

(72) Inventors: John P. Wootton, Nottingham (GB); Marisol Morales, Derby (GB)

(73) Assignee: ROLLS-ROYCE plc, London (GB)

( * ) Notice: Subject to any disclaimer, the term of this patent is extended or adjusted under 35 U.S.C. 154(b) by 77 days.

(21) Appl. No.: 16/047,403

(22) Filed: Jul. 27, 2018

(65) Prior Publication Data

US 2019/0093516 A1    Mar. 28, 2019

(30) Foreign Application Priority Data

Jul. 31, 2017   (GB) .................................. 1712242.5

(51) Int. Cl.
*F01D 25/28*  (2006.01)
*F02C 7/32*   (2006.01)
(Continued)

(52) U.S. Cl.
CPC ............. *F01D 25/28* (2013.01); *F01D 25/12* (2013.01); *F02C 7/18* (2013.01); *F02C 7/20* (2013.01); *F02C 7/32* (2013.01); *F02K 3/105* (2013.01); *F02K 3/115* (2013.01); *F05D 2220/32* (2013.01); *F05D 2230/642* (2013.01); *F05D 2240/91* (2013.01); *F05D 2260/20* (2013.01);
(Continued)

(58) Field of Classification Search
None
See application file for complete search history.

(56) References Cited

U.S. PATENT DOCUMENTS 6,102,610 A * 8/2000 Palusis ..................... F02K 1/80
                                                   403/179
7,721,546 B2 * 5/2010 Fish ........................ F23R 3/283
                                                    60/739
(Continued)

FOREIGN PATENT DOCUMENTS

DE    2414069    10/1975
DE    3209008    9/1983
(Continued)

OTHER PUBLICATIONS

Great Britain Search Report dated Jan. 30, 2018 issued in GB Patent Application No. 1712242.5.
(Continued)

*Primary Examiner* — Michael Lebentritt
(74) *Attorney, Agent, or Firm* — Shumaker & Sieffert, P.A.

(57) ABSTRACT

A mount assembly for attaching a heat exchanger to a casing of a gas turbine engine comprises a first attachment feature by which in use the mount assembly is attached to the casing and a second attachment feature spaced from the first attachment feature by which in use the mount assembly is attached to the heat exchanger. The first and second attachment features are joined by an elongate member. The assembly is characterised in that the elongate member is significantly larger in a length direction and a height direction than in a thickness direction, so that it is relatively stiff in the length and height directions L, H and relatively flexible in the thickness direction T; the flexibility allowing movement in use within the mount assembly to accommodate differential thermal expansion between the heat exchanger and the casing.

5 Claims, 3 Drawing Sheets

(51) Int. Cl.
*F02C 7/20* (2006.01)
*F02K 3/105* (2006.01)
*F02C 7/18* (2006.01)
*F01D 25/12* (2006.01)
*F02K 3/115* (2006.01)

(52) U.S. Cl.
CPC .... *F05D 2260/213* (2013.01); *F05D 2260/30* (2013.01)

(56) References Cited

U.S. PATENT DOCUMENTS

| | | | | |
|---|---|---|---|---|
| 7,874,059 | B2* | 1/2011 | Morrison | F16B 5/0266 29/446 |
| 8,061,977 | B2* | 11/2011 | Keller | F01D 21/045 415/173.1 |
| 2005/0089401 | A1* | 4/2005 | Phipps | F01D 11/16 415/178 |
| 2007/0033940 | A1* | 2/2007 | Duverneuil | F01D 25/28 60/743 |
| 2009/0056337 | A1* | 3/2009 | Commaret | F23R 3/283 60/740 |
| 2011/0146051 | A1* | 6/2011 | Hand | F28F 9/0075 29/525.01 |
| 2011/0146944 | A1* | 6/2011 | Hand | F02K 1/822 165/47 |
| 2012/0186269 | A1* | 7/2012 | Cihlar | F23R 3/60 60/796 |
| 2013/0017082 | A1* | 1/2013 | Casavant | F01D 25/285 415/213.1 |
| 2014/0366453 | A1* | 12/2014 | Cooper | F01D 25/24 49/465 |
| 2015/0075176 | A1* | 3/2015 | Ruthemeyer | F02K 1/04 60/796 |
| 2016/0369656 | A1* | 12/2016 | Mulcaire | B22F 3/1258 |
| 2017/0023017 | A1* | 1/2017 | Dreischarf | B64D 29/00 |
| 2018/0187571 | A1* | 7/2018 | Recuero | F02C 7/20 |

FOREIGN PATENT DOCUMENTS

| | | |
|---|---|---|
| EP | 0994304 | 4/2000 |
| EP | 3346113 A1 | 7/2018 |
| FR | 2990001 A1 | 1/2013 |

OTHER PUBLICATIONS

Extended European Search Report from counterpart EP Application No. 18185164.3, dated Dec. 6, 2018, 7 pgs.
Response to Extended European Search Report from counterpart EP Application No. 18185164.3, dated Dec. 6, 2018, filed Jul. 25, 2019, 9 pgs.

* cited by examiner

… … …

MOUNT ASSEMBLY

CROSS-REFERENCE TO RELATED APPLICATIONS

This application is based upon and claims the benefit of priority from British Patent Application No. GB 1712242.5, filed on 31 Jul. 2017, the entire contents of which are herein incorporated by reference.

BACKGROUND

Technical Field

The present disclosure concerns a mount assembly for mounting a heat exchanger to a casing of a gas turbine engine.

Description of the Related Art

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

SUMMARY

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Accessory units provide power for aircraft hydraulic, pneumatic and electrical systems, in addition to providing various pumps and control systems for efficient engine operation. One known type of accessory unit is a variable-frequency starter-generator or VFSG.

The cooling for the VFSG is provided by a surface air-oil heat exchanger or SAOHE. The SAOHE is typically mounted on the inner surface of the fan casing so that the bypass airflow will provide cooling.

In use the SAOHE is subject to thermal expansion and contraction, which may be different from the expansion and contraction of the fan casing. Typically this may result in up to 5 mm of relative movement between the SAOHE and the fan casing. The mounting features of the SAOHE must therefore be designed to accommodate this thermal expansion.

FIG. 2A shows a mount assembly 30 of known type for mounting a SAOHE 34 to a fan casing 32. The SAOHE 34 would be mounted to the fan casing 32 by a plurality of such mount assemblies 30 spaced over the whole area of the SAOHE 34. The predominant direction of thermal expansion and 25 contraction of the SAOHE in use is shown by the arrow 36.

The circled region of FIG. 2A is shown in more detail in FIG. 2B. A bracket 40 is bolted to the fan casing 32. A bolt 42 secures a spacer 44 to the SAOHE 34. Between the spacer 44 and the bolt 42 head are a plain washer 50 and a disc spring 52. The plain washer 50 and the spacer 44 engage opposite 30 surfaces of the bracket 40. As shown in the drawing, left 40a and right 40b sections of the bracket 40 delimit a lateral slot 48, aligned in the direction 36 of thermal expansion. In use, the spacer 44 can move within the slot 48 to accommodate thermal expansion and contraction of the SAOHE 34.

The disc spring provides an axial load on the bolted assembly, which helps to secure the mating components without requiring a high clamping force on the bolt. As an alternative to the disc spring, another resilient element may be used such as a spring washer, load spreading washer or Vespel® washer.

Disadvantages of this design include expense, weigh and bulk owing to the high part count. Assembly and installation are complicated by the need for access both from inside and from outside the fan casing. Also, the available expansion is limited by the washer size. The force transmitted into the SAOHE varies with friction and pre-load, which may be detrimental to the SAOHE life. Pre-load can vary because the tolerance stack-up changes the compression of the spring, and the friction can change over the life of the engine, particularly for a component in the harsh environment of the bypass duct.

FIG. 3 shows another known design of mount assembly 132, in which nut-and-bolt assemblies 136 secure the mount assembly to the fan casing (not shown in FIG. 3) and a bolt 50 secures the SAOHE (not shown in FIG. 3) to the mount assembly. In this design of mount assembly, a bushing 52 is bonded to the fan casing, a rubber washer 54 is in contact with the outside surface of the fan casing and a steel washer 56 is in contact with the rubber washer. A pin (not shown) slides against this steel washer 56 and mates with the SAOHE at its opposite end. The securing bolt 50 is mounted from the inside (SAOHE side). An external bracket 60 prevents the pin from rotating so that the bolt can be removed when necessary.

Disadvantages of this design include difficulty in reassembly after maintenance, because the mount assembly does not centralise itself, and that the mount assembly forms the boundary between the inner and outer sides of the fan casing, but the sliding joints are not fire- or fluid-proof. The assemblies therefore do not provide a fire boundary across the fan casing and must therefore be fitted with a heavy and bulky cap.

It would be beneficial to have a mounting arrangement for SAOHEs that mitigates or overcomes the disadvantages of known arrangements.

According to a first aspect there is provided a mount assembly for attaching a heat exchanger to a casing of a gas turbine engine as set out in claim 1 and the claims dependent thereon. According to a second aspect there is provided an arrangement for mounting a heat exchanger on a casing of a gas turbine engine as set out in claim 5.

The skilled person will appreciate that except where mutually exclusive, a feature described in relation to any one of the embodiments may be applied mutatis mutandis to any other embodiment. Furthermore except where mutually exclusive any feature described herein may be applied to any embodiment and/or combined with any other feature described herein.

DESCRIPTION OF THE DRAWINGS

Embodiments will now be described by way of example only, with reference to the Figures, in which.

DETAILED DESCRIPTION

Figure 1:
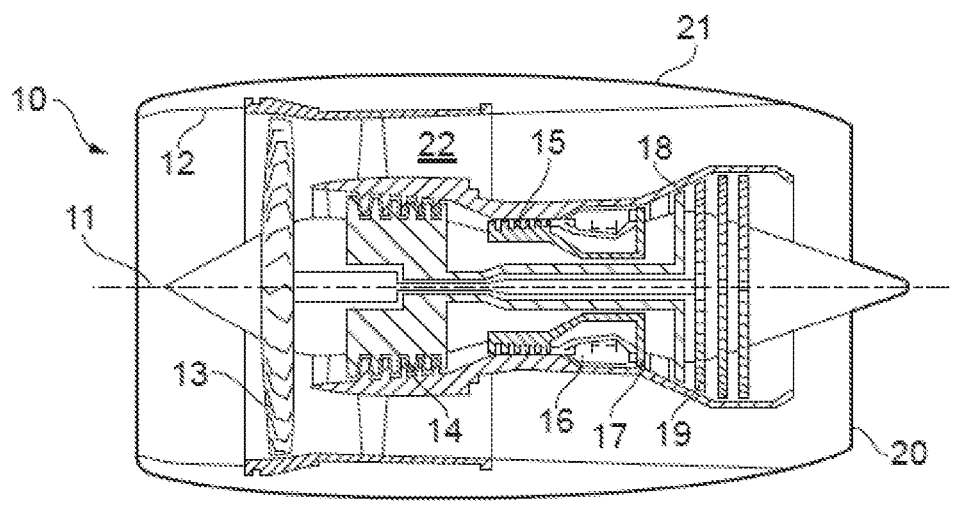
FIG. 1 is a sectional side view of a gas turbine engine, as already described.
Figure 2A:
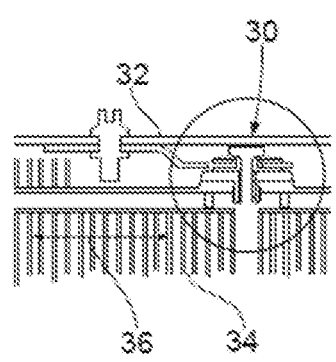
FIG. 2A is a schematic cross-sectional view of a known type of mount assembly for an SAOHE, as already described.
Figure 2B:
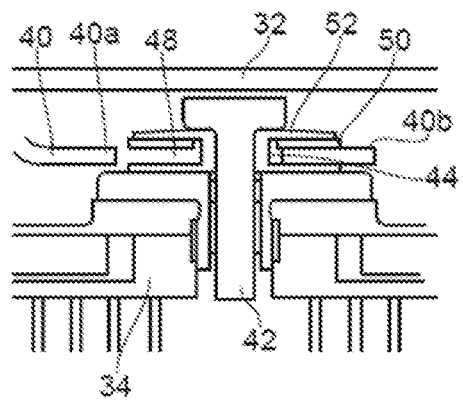
FIG. 2B shows in more detail the circled region in FIG. 2A.
Figure 3:
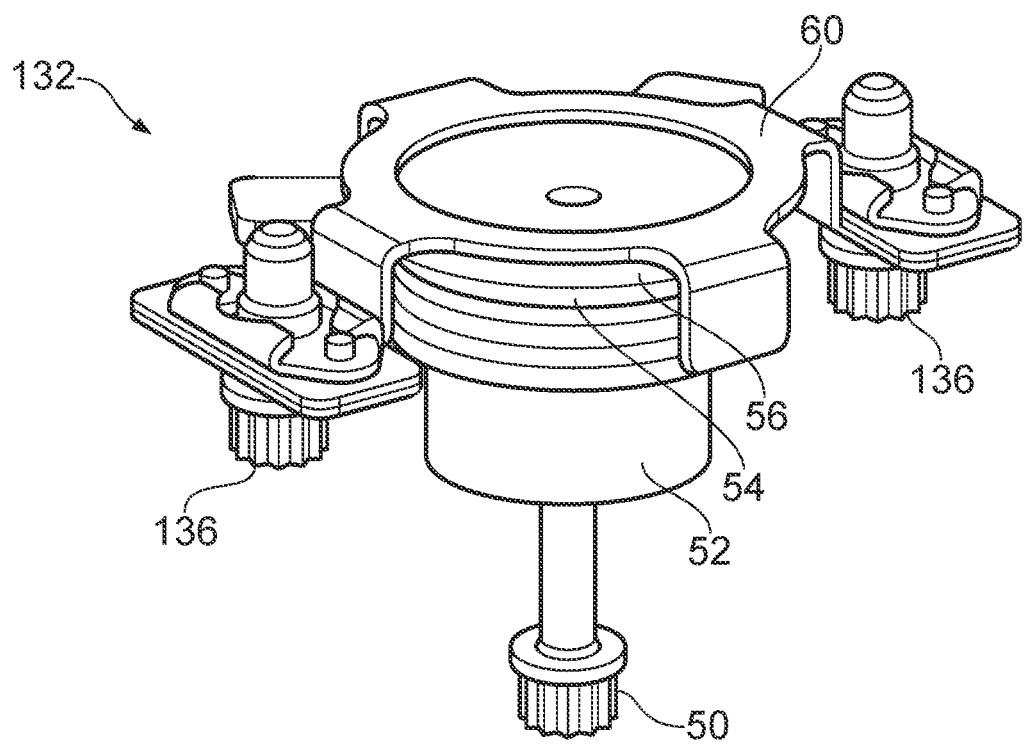
FIG. 3 is a schematic perspective view of another known type of mount assembly, as already described.
Figure 4:
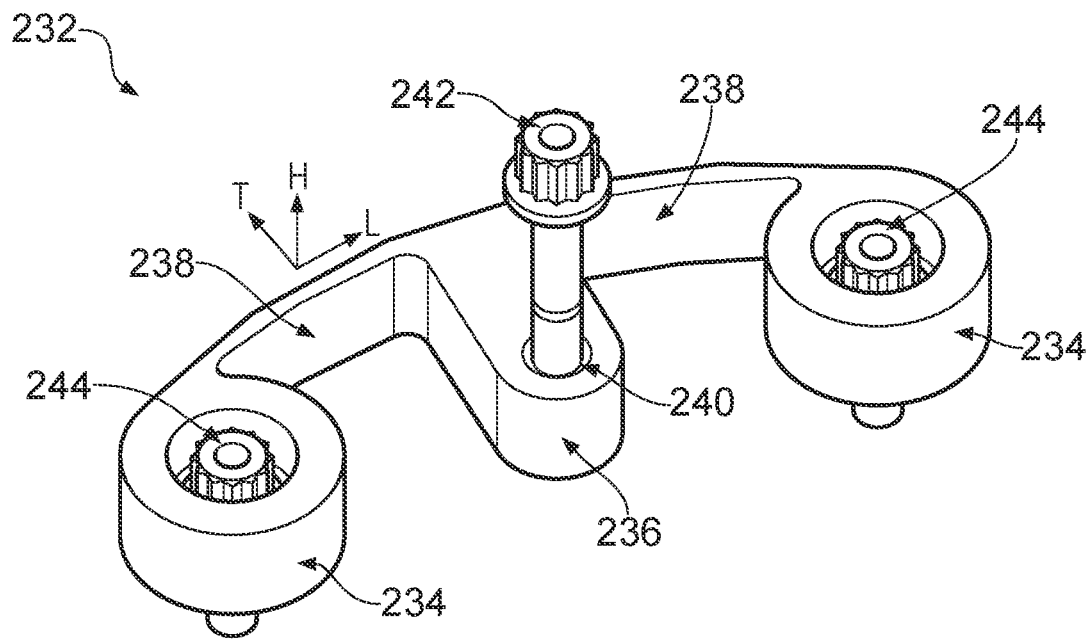
FIG. 4 is a schematic perspective view of a mount assembly.

In FIG. 4, a mount assembly is shown generally at 232. The mount assembly 232 comprises two first attachment features in the form of end bosses 234 and a second attachment feature in the form of a central boss 236. Each end boss 234 is joined to the central boss 236 by a respective elongate member in the form of a flexible beam 238. As can be seen from FIG. 4, the two flexible beams 238 are significantly larger in a length direction L and a height direction H than in a thickness direction T, as shown by the appended arrows, and therefore they will be relatively stiff in the length and height directions L, H and relatively flexible in the thickness direction T.

A threaded insert 240 is located in the central boss 236, which in use receives a bolt 242 as will be explained below. In use bolts 244 pass through the end bosses 234 as will also be explained below.

Figure 5:
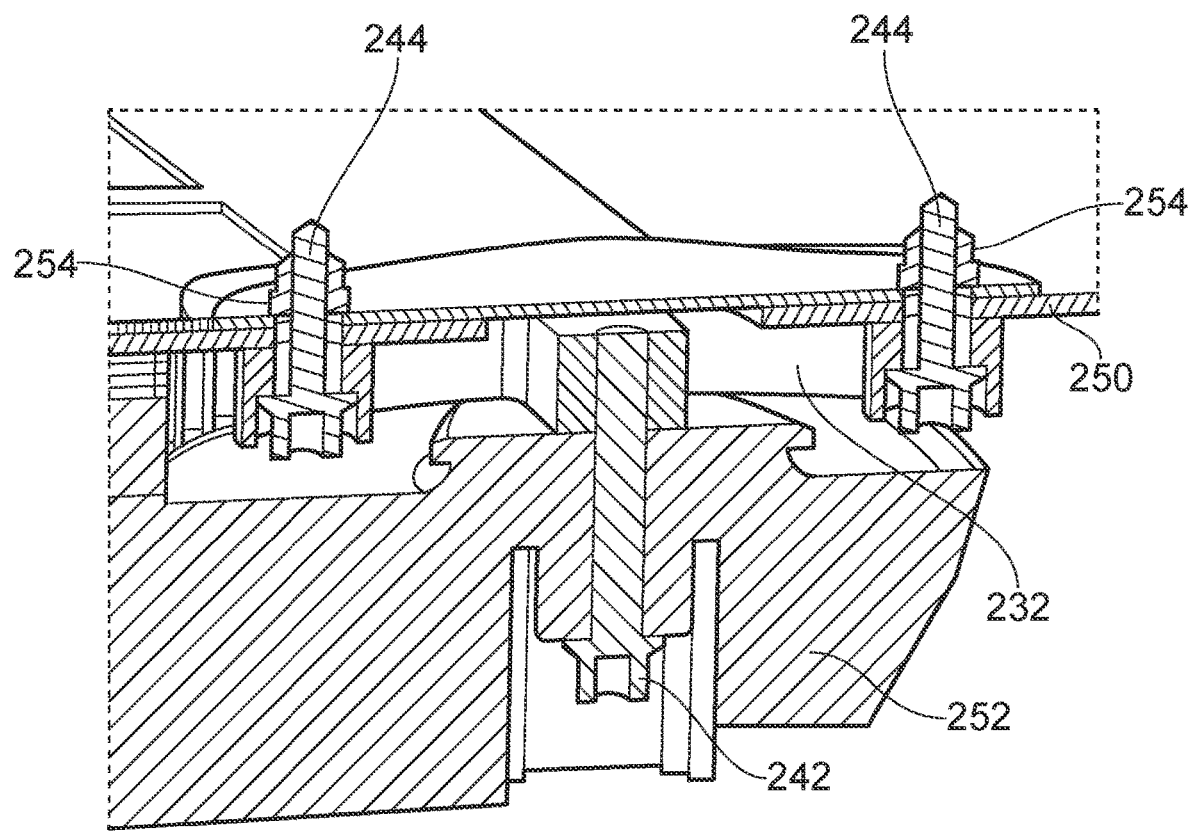
FIG. 5 shows the installation of the mount assembly of FIG. 5.

FIG. 5 shows the mount assembly 232 of FIG. 4 interposed between a fan casing 250 and a SAOHE 252. Two bolts 244 extend through the end bosses (234 in FIG. 4) to secure the mount assembly 232 to the fan casing 250 by means of nuts 254. Bolt 242 extends through the SAOHE 252 and is received by the threaded insert 240 to secure the SAOHE 252 to the mount assembly 232. A plurality of mount assemblies 232 spaced over the whole area of the SAOHE 252 secure the SAOHE 252 to the fan casing 250.

The SAOHE 252 is therefore secured to the casing 250 via the plurality of mount assemblies 232. Because of the geometry of the mount assembly 232, specifically the geometry of the two flexible beams 238, the connection between the SAOHE 252 and the casing 250 is relatively rigid in a length direction of the bolts 242, 244 and in the direction of a line joining the two end bosses 234 (respectively directions H and L in FIG. 4); but relatively flexible in the direction perpendicular to those two directions (direction T in FIG. 4). This flexibility allows movement in the direction T within the mount assembly 232 to accommodate differential thermal expansion, without compromising the secure fixing of the SAOHE to the engine casing.

Figure 6:
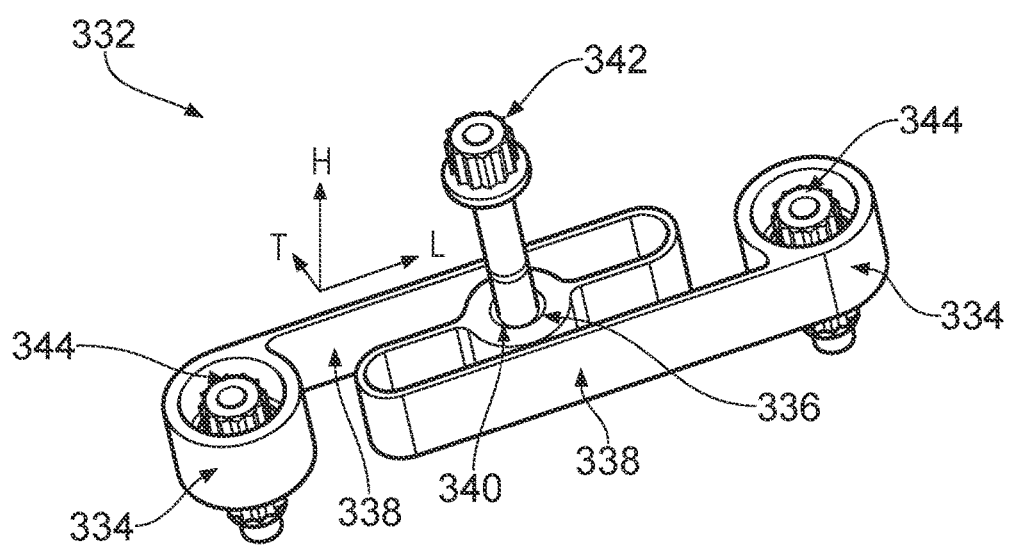
FIG. 6 is a schematic perspective view of a further mount assembly.

FIG. 6 shows a further mount assembly 332. The mount assembly 332 comprises two first attachment features in the form of end bosses 334 and a second attachment feature in the form of a central boss 336. Each end boss 334 is joined to the central boss 336 by a respective elongate member in the form of a flexible beam 338. As in the arrangement of FIG. 4, a threaded insert 340 is located in the central boss 236, which in use receives a bolt 342. Similarly, in use, bolts 344 pass through the end bosses 334.

In contrast to the arrangement in FIG. 4, the two flexible beams 338 are S-shaped. As in FIG. 4, however, the two flexible beams 338 are significantly larger in a length direction L and a height direction H than in a thickness direction T, as shown by the appended arrows; therefore they will also be relatively stiff in the length and height directions L, H and relatively flexible in the thickness direction T.

The mount assembly 332 may be used to secure a SAOHE to an engine casing in the same way as shown in FIG. 5 for the mount assembly 232. As in that arrangement, the geometry of the mount assembly 332 will allow movement in the direction T within the mount assembly 332 to accommodate differential thermal expansion, without compromising the secure fixing of the SAOHE to the engine casing.

Mount assemblies as shown in FIGS. 4 and 6 therefore provide a simpler and more reliable means for mounting SAOHEs or other heat exchangers to engine casings to accommodate differential thermal expansion. Because the flexibility in the mount assembly arises from the geometry of the assembly itself, it is not dependent on material or tolerance variability as in prior solutions; nor is It susceptible to variation over the life of the components.

The mount assembly as shown in FIGS. 4 and 6 is easily manufactured using known techniques such as injection moulding or additive manufacturing. The material and the precise geometry of the mount assembly—for example, the length and curvature of the flexible beams in the assembly of FIG. 4 or the length and configuration of the S-shape in the assembly of FIG. 6—can be selected to provide the desired degree of flexibility (and, equally, the desired degree of rigidity in the other two, perpendicular, directions).

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A mount assembly for attaching a heat exchanger to a casing of a gas turbine engine, the assembly comprising:
   a first attachment feature by which the mount assembly is attached to the casing;
   a second attachment feature spaced from the first attachment feature by which the mount assembly is attached to the heat exchanger; and
   an elongate member that joins the first and second attachment features, wherein the elongate member is larger in a length direction, L, extending between the first and second attachment features and in a height direction, H, extending between the heat exchanger and the casing, than in a thickness direction, T, extending perpendicular to the length direction, L, and the height direction, H, so that the elongate member is more stiff in the length and height directions L, H, than in the thickness direction, and more flexible in the thickness direction T than in the length, L, and height, H, directions, the flexibility allowing movement within the mount assembly to accommodate differential thermal expansion between the heat exchanger and the casing.

2. The mount assembly of claim 1, in which the assembly comprises two first attachment features and two elongate members, each first attachment feature being joined to the second attachment member by a respective elongate member.

3. The mount assembly of claim 1, in which the elongate member is S-shaped.

4. The mount assembly of claim 1, in which the second attachment feature comprises a threaded insert.

5. An arrangement for mounting a heat exchanger on a casing of a gas turbine engine, the arrangement comprising a plurality of mount assemblies as claimed in claim 1.

* * * * *